US010171966B1

(12) United States Patent
Huberman et al.

(10) Patent No.: US 10,171,966 B1
(45) Date of Patent: *Jan. 1, 2019

(54) CROWD-SOURCED PASSIVE POSITIONING AND CALIBRATION

(71) Applicant: MAPSTED CORP., Mississauga (CA)

(72) Inventors: Sean Huberman, Guelph (CA); Paramvir Singh Nagpal, Brampton (CA); Saeedeh Hamidifar, Mississauga (CA)

(73) Assignee: MAPSTED CORP., Mississauga, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/974,296

(22) Filed: May 8, 2018

Related U.S. Application Data

(63) Continuation of application No. 15/713,904, filed on Sep. 25, 2017, now Pat. No. 10,003,928.

(51) Int. Cl.
*H04W 24/00* (2009.01)
*H04W 4/33* (2018.01)

(52) U.S. Cl.
CPC .................................. *H04W 4/33* (2018.02)

(58) Field of Classification Search
CPC .......... H04W 4/33; H04W 4/04; H04W 64/00

USPC .... 455/456.1, 404.2, 419, 421, 414.1, 422.1
See application file for complete search history.

(56) References Cited

U.S. PATENT DOCUMENTS

| 10,003,928 B2 * | 6/2018 | Nagpal | H04W 4/04 |
| 2016/0094950 A1 * | 3/2016 | Millman | H04W 4/026 |
| | | | 455/456.1 |
| 2016/0192145 A1 * | 6/2016 | Alsehly | G01S 5/0236 |
| | | | 455/456.1 |
| 2016/0198310 A1 * | 7/2016 | Chalmers | H04W 4/046 |
| | | | 455/456.1 |

* cited by examiner

*Primary Examiner* — Nghi H Ly
(74) *Attorney, Agent, or Firm* — Henry L. Ohab

(57) ABSTRACT

A method and system for deploying a calibrated positioning map of an area. The method, executed in a processor of a server computing device, comprises generating, using the processor, a distribution of positioning data points based at least in part on a first set of fingerprint data, the positioning data points calibrated in accordance with respective positions within the area, receiving, at the memory, a second set of fingerprint data, processing, using the processor, the second set of fingerprint data and the positioning data points to generate an updated distribution of positioning data points, and when the updated distribution exceeds a threshold density of positioning data points, deploying the updated distribution as the positioning map of the area.

20 Claims, 4 Drawing Sheets

CROWD-SOURCED PASSIVE POSITIONING AND CALIBRATION

CROSS-REFERENCE TO RELATED APPLICATION

This application claims the benefit of priority to U.S. application Ser. No. 15/713,904 filed Sep. 25, 2017, now issued as U.S. Pat. No. 10,003,928, and hereby incorporates said U.S. application Ser. No. 15/713,904 in the entirety herein.

BACKGROUND

Users of mobile devices are increasingly using and depending upon indoor positioning and navigation applications and features. Seamless, accurate and dependable indoor positioning can be difficult to achieve using satellite-based navigation systems when the latter becomes unavailable or sporadically available, such as within enclosed or partly enclosed urban infrastructure and buildings, including hospitals, shopping malls, airports, universities and industrial warehouses. To address this problem, indoor navigation solutions increasingly rely on sensors including accelerometers, gyroscopes, and magnetometers which may be commonly included in mobile phones and other mobile devices. However, inertial navigation sensor-based solutions are often not suitable due to error accumulation resulting from inherent susceptibility of the sensors to sensor draft and bias.

DETAILED DESCRIPTION

Figure 1:
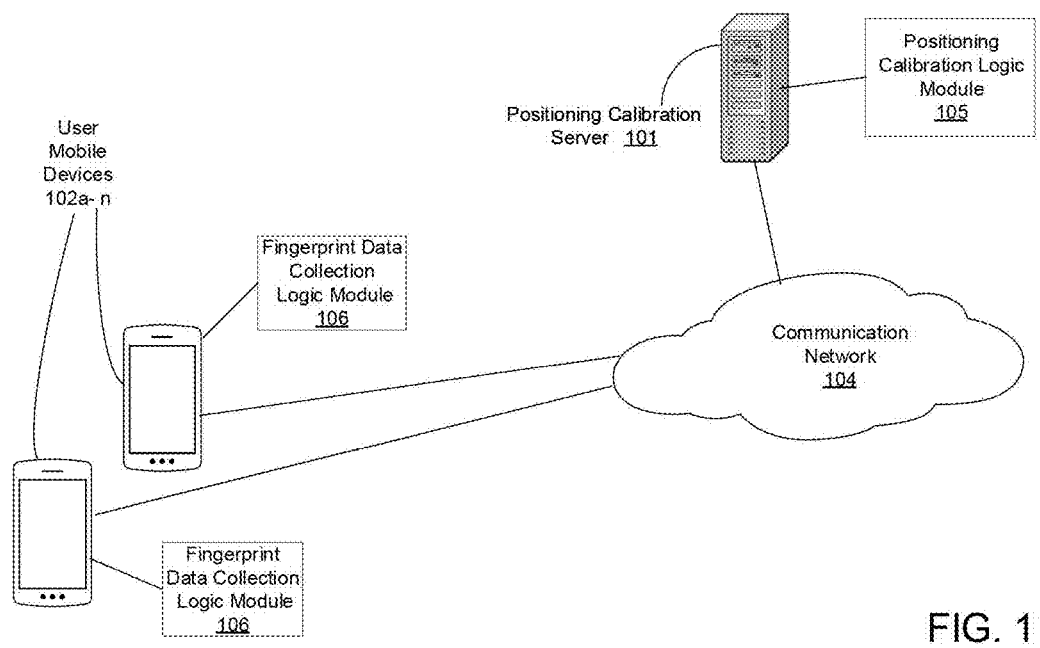
FIG. 1 illustrates, in an example embodiment, a system for generating and deploying a calibrated positioning map of an area.

Among other benefits and technical effect, embodiments provided herein alleviate the bottleneck imposed by a fingerprint calibration mapping process as a prerequisite to deployment of indoor navigation and positioning solutions, and enable more rapid deployment, and easier scalability, of an indoor navigation solution by utilizing a crowd-sourcing based alternative approach.

The majority of indoor navigation systems require some form of system calibration prior to going live upon deployment. The most typical type of calibration for positioning, also referred to herein as navigation, is fingerprinting. The term fingerprint, variously referred to herein as calibration fingerprint and fingerprint data, in one embodiment constitutes any combination of time-correlated, individual measurements of received wireless communication signal strength information, magnetic field information (strength, direction) or barometric pressure information at known, fixed locations within an area, including an indoor area. In other words, a fingerprint includes a correlation of sensor and signal information (including, but not necessarily limited to wireless signal strength, magnetic or barometric information inertial sensor information) at a given instance in time, at a unique position along a sequence of positions that constitute a navigation path traversed by the mobile device. Additionally, given that sampling times and sampling rates applied to particular device sensors may be different, the signal and sensor information as measured may be time-averaged across particular periods of time, with the time-averaged value being used to represent the signal information at any given instance of time within that particular period of time in which the signal information is time-averaged.

In order to ensure sufficiently high accuracy of an indoor positioning or navigation solution, many individual fingerprint measurements must be taken at many locations within an area during the fingerprint calibration and mapping process. Since each such measurement may typically take at least several minutes at each location or position, the fingerprint calibration and mapping process therefore constitutes a highly labor- and time-intensive, expensive limiting barrier to deployment and scalability of indoor navigation solutions.

More specifically, in the crowd sourcing-based approach, users may be provided an indoor positioning mobile device application, and may be encouraged to walk around the area of interest, such as an indoor shopping mall. At various known, fixed locations within the area, events, also referred to herein as occurrence events, may be triggered and logged. Based on the logged data, an offline estimation of the user trajectory may be determined, and corresponding to known fixed locations, fingerprint measurements may be correlated with respective indoor locations along a trajectory, or trajectory segments, along which a user's mobile device traverses while within the area. As more trajectories from numerous other users are accumulated and logged, the averaging of user results may be used to accomplish a fingerprint mapping of the area or region.

In particular, the crowd sourcing based embodiments described here advantageously avoid the need for tedious and expensive specially-purposed, dedicated calibration fingerprint mapping, and result in a more accurate calibration fingerprint map representation of the targeted environment. Users incentives, for example, may be offered, to encourage random mobile device users to participate using their mobile device indoor navigation application. Among other technical effects and benefits of the efficient, easy-to-deploy, scalable crowd sourced-based solution to indoor navigation calibration described herein, utilizing known fixed locations within the target area or building allows for more accurate interpolation and reconstruction of the user's mobile device trajectory, or a trajectory segment, resulting in a more accurate construction of fingerprints and associated fingerprint map, than can be provided by a dedicated calibration mapping of wireless beacon signal strengths, for example.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processor and memory resources. For example, one or more embodiments described herein may be implemented, in whole or in part, on computing devices such as servers, desktop computers, mobile devices including cellular or smartphones, laptop computers, wearable devices, and tablet devices. Memory, processing, and network resources may all be used in connection with the establishment, use, or performance of any embodiment described herein, including with the performance of any method or with the implementation of any system.

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable memory storage units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Description

FIG. 1 illustrates, in an example embodiment, positioning calibration system 100 for generating and deploying a calibrated positioning map of a given area, including but not limited to an indoor area. Positioning calibration server 101, also referred to herein as server 101, includes positioning calibration logic module 105, and is communicatively connected via communication network 104 to a plurality of computing and communication mobile devices 102a-n, also referred to herein as mobile device(s) 102a-n. Mobile devices 102a-n include fingerprint data collection logic module 106, which in one embodiment, may be included in an indoor positioning, or indoor navigation, software application downloaded and installed at individual ones of mobile devices 102a-n.

Figure 2:
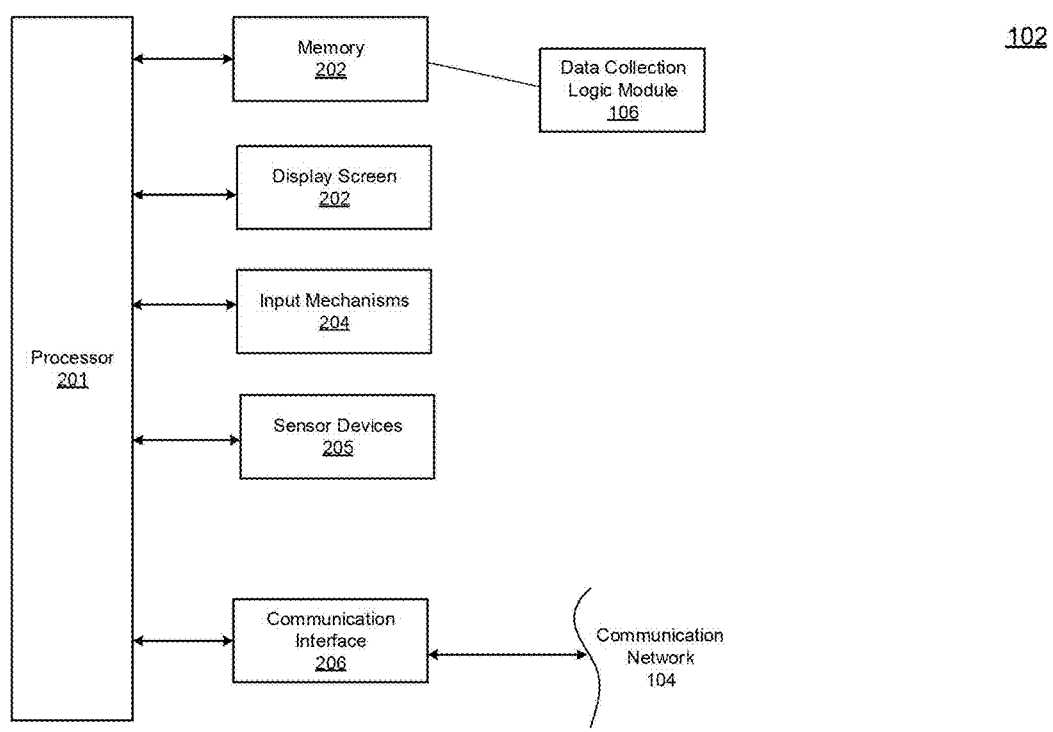
FIG. 2 illustrates an example architecture of a computing and communication mobile device for data collection using the mobile device.

FIG. 2 illustrates an example architecture of computing and communication mobile devices 102a-n used for fingerprint data collection. As used herein, the term mobile device 102 refers to any singular mobile device among mobile devices 102a-n. In one embodiment, mobile device 102 may correspond to, for example, a cellular communication device (e.g., smartphone, tablet, etc.) that is capable of telephony, messaging, and/or data computing services. In variations, mobile device 102 can correspond to, for example, a tablet or a wearable computing device. Mobile device 102 may include processor 201, memory 202, display screen 203, input mechanisms 204 such as a keyboard or software-implemented touchscreen input functionality, barcode, QR code or other symbol- or code-scanner input functionality. Mobile device 102 may include sensor functionality by way of sensor devices 205. Sensor devices 205 may include any of inertial sensors (accelerometer, gyroscope), magnetometer or other magnetic field sensing functionality, and barometric or other environmental pressure sensing functionality. Mobile device 102 may also include capability for detecting and communicatively accessing wireless communication signals, including but not limited to any of Bluetooth, Wi-Fi, RFID, and GPS signals. Mobile device 102 further includes the capability for detecting and measuring a received signal strength of the wireless communication signals. In particular, mobile device 102 may include location determination capability such as by way of GPS module 205, and communication interface 206 for communicatively coupling to communication network 104, such as by sending and receiving cellular data over data channels and voice channels.

Fingerprint data collection logic module 106 includes instructions stored in memory 202 of mobile device 102. In embodiments, fingerprint data collection logic module 106 may be included in a mobile device navigation application program stored in memory 202 of mobile device 102 for acquiring fingerprint data within an area by any of plurality of mobile devices 102a-n. The area may be an indoor area within a shopping mall, an airport, a warehouse, a university, or any at least partially enclosed building. Acquisition of the fingerprint data may be automatically triggered at respective ones of mobile devices 102a-n upon an event occurrence. The event occurrence may consist of a user of mobile device 102 redeeming a promotion coupon at a merchant within a shopping mall, scanning a barcode, using an RFID tag, or upon the mobile device 102 becoming present at specific predetermined locations within the area. The occurrence event may be also based on detecting a proximity beacon wireless signal, in some examples. Acquisition of the fingerprint data by a user's mobile device 102 may thus be automatically triggered upon the event occurrence at any one of a predetermined set of fixed positions within the area.

In this manner, a user of mobile device 102 may, in effect, passively assist in the positioning calibration process by acquiring fingerprint data, then allowing uploading or other transfer of the acquired fingerprint data to server 101 for further processing. The fingerprint data may be acquired at least in part using sensor devices 205 of the mobile devices, including but not limited to an accelerometer, a gyroscope, a magnetometer, a barometer, and a wireless signal strength sensor. The fingerprint data may include any one of orientation data, a magnetic field data including strength and direction, received wireless signal strength data, barometric pressure data, and also GPS location data at a position within the area for respective mobile devices.

As the fingerprint data acquired at mobile device 102 is time-stamped and the data collection via fingerprint data collection logic module 106 operates in a distributed manner, the fingerprint data may be cached on the local memory 202 and subsequently batch transferred as a compressed data file for post-processing at positioning calibration server 101, in some embodiments. Fingerprint data collection logic module 106, in effect, operates to pre-process fingerprint data and extract key features which can assist in the mobile device 102 trajectory reconstruction during the post processing step at server 101. The pre-processing step at fingerprint data collection logic module 106 may include counting the number of steps taken by a user of mobile device 102, estimating the step length of each step, estimating the heading direction for each step, as well as, recording the time-averaged and time-stamped magnetic field information and wireless radio signals, and monitoring for, and logging, occurrence of any triggered event/tag-based data that enables the trajectory of mobile device 102 to be best matched a physical map of the area that includes known fixed objects at unique locations.

Figure 3:
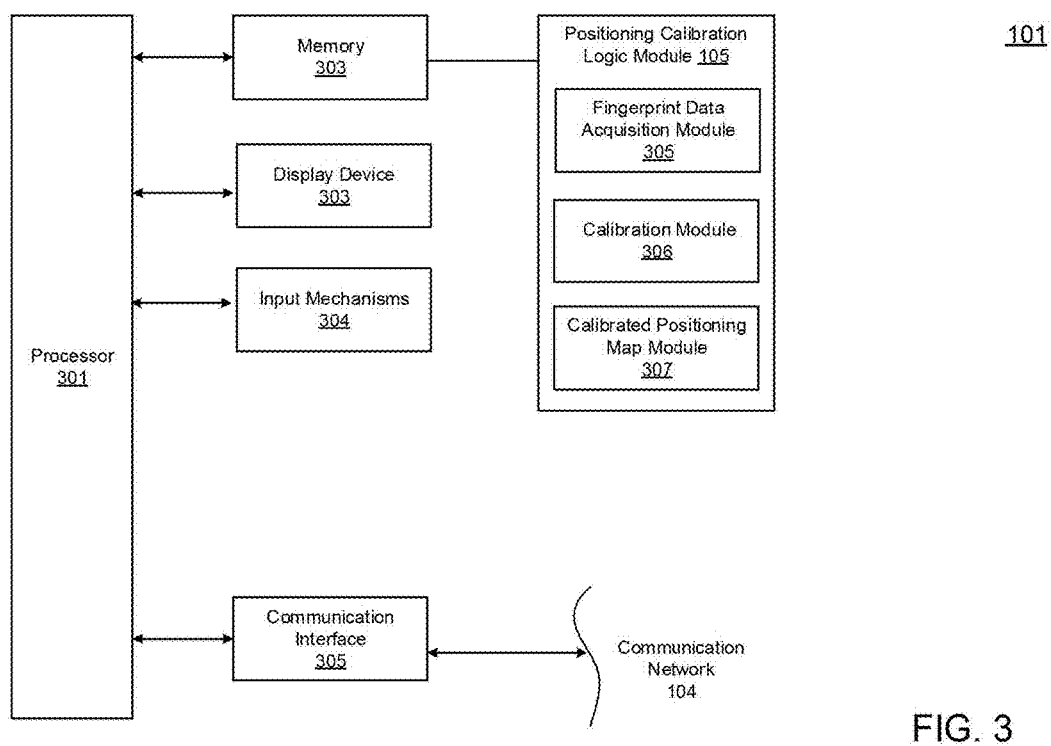
FIG. 3 illustrates an example architecture of a server computing device for generating and deploying the calibrated positioning map.

FIG. 3 illustrates an example architecture of a server computing device 101 for generating and deploying the calibrated positioning map. Server 101, in an embodiment architecture, may be implemented on one or more server devices, and includes processor 301, memory 302 which may include a read-only memory (ROM) as well as a random access memory (RAM) or other dynamic storage device, display device 303, input mechanisms 304 and communication interface 305 for communicative coupling to communication network 104. Processor 301 is configured with software and/or other logic (such as from positioning calibration logic module 105) to perform one or more processes, steps and other functions described with implementations, such as described by FIGS. 1 through 4 herein. Processor 301 may process information and instructions stored in memory 302, such as provided by a random access memory (RAM) or other dynamic storage device, for storing information and instructions which are executable by processor 301. Memory 302 also may be used for storing temporary variables or other intermediate information during execution of instructions to be executed by processor 301. Memory 302 may also include the ROM or other static storage device for storing static information and instructions for processor 301; a storage device, such as a magnetic disk or optical disk, may be provided for storing information and instructions. Communication interface 305 enables server 101 to communicate with one or more communication networks 104 (e.g., cellular network) through use of the network link (wireless or wired). Using the network link, server 101 can communicate with computing devices 102a-n.

Calibration logic module 105 of shared transport server 101 may include instructions stored in RAM of memory 302, and includes fingerprint data acquisition module 305, calibration module 306, and calibrated positioning map module 307. Processor 301 uses executable instructions stored in fingerprint data acquisition module 305 to Processor 301 uses executable instructions stored in fingerprint data acquisition module 305 to acquire fingerprint data within the area by a plurality of mobile devices 102a-n. The area may be an indoor area within a shopping mall, an airport, a warehouse, a university, or any at least partially enclosed building. In embodiments, the fingerprint data, as acquired from mobile devices 102a-n, further includes respective time-stamps, whereby the orientation, the magnetic field strength and direction, the received wireless signal strength, the barometric pressure, and the position data can be time-correlated for any given position along a trajectory or trajectory segment of the mobile devices, in accordance with the respective time-stamps. Additionally, when the sampling times and sampling rates applied to particular ones of device sensors 205 are different, the signal and sensor information as measured may be time-averaged across particular periods of time, with the time-averaged value being used to represent the signal information at any given instance of time within that particular period of time in which the signal information is time-averaged.

Processor 301 uses executable instructions stored in calibration module 306 to generate a distribution of calibrated data points based at least in part on a first set of fingerprint data, the calibrated data points representing respective positions within the area, which may be an indoor area, in embodiments. The term "position" as used herein refers to a coordinate location, and may be expressed in local or global (X, Y) coordinate terms. In some embodiments, the coordinates may further include a Z coordinate representing a height, for example associated with a given floor within a multi-floor building, and thus expressed in (X, Y, Z) coordinate terms. Further processing, via the instructions constituting calibration module 306 executable in processor 301, may apply for a second set of fingerprint data and the calibrated data points to generate an updated distribution of calibrated data points. The processing to generate the distribution of calibrated data points may include matching the fingerprint data based at least partly on the correlations, amalgamating the matched data from respective ones of the plurality of mobile devices 102a-n and any additional mobile devices into a cumulative calibration dataset. Then generating, based on the cumulative calibration dataset, the distribution of calibrated data points mapped to respective positions within the area.

Calibration module 306 operates in post-processing of the fingerprint data at server 101. Specifically, the ability to accurately post-process the user data to identify trajectories or trajectory-segments of the mobile devices 102a-n in which time-stamped user positions are known with sufficient reliability. Then, by linking the known time-stamped user positions with the time-stamped measured sensor devices 205 data, calibration data points are formed. As more users cumulatively enter the system, the accumulative amalgamation of crowd-sourced, multi-users' calibration points forms a distribution over the targeted area, such as an indoor area of a shopping mall.

Processor 301 uses executable instructions stored in calibrated positioning map module 307 to deploy the updated distribution as the calibrated positioning map of the area, upon the updated distribution exceeding a predetermined threshold density of calibration data points. A density determination algorithm may be applied, in one embodiment, to establish the predetermined threshold density based on validating the updated distribution of calibrated data points as sufficient for deployment, representing the calibrated position map of the area. In another embodiment, the threshold density for deployment may be dynamically determined, and dynamically updated, based on updating at least one of the density of calibration data points and the consistency amongst the calibration data points relative to a neighboring area contiguous with the target area. Dynamically updating the threshold density in the latter manner allows the system to automatically detect and correct potential calibration inconsistencies prior to deploying the calibrated positioning map of the area. The density determination algorithm may be employed in conjunction with an artificial neural network to validate when a sufficient number of fingerprint calibration data points have been collected and accumulated for specific areas or regions within the areas. In particular, this process can also assist in identifying pedestrian traffic patterns and traffic densities for particular areas and times within the area or the shopping mall, as well as to provide the capability to assess whether or not a sufficient amount of data has been collected to complete the calibration process. In the present embodiment, the one-time artificial neural network processing initializes the fingerprint data. Moreover, based on the artificial neural network processing, a dynamic incremental fingerprint updating scheme may be employed to dynamically maintain up-to-date fingerprint calibration data sets.

Methodology

Figure 4:
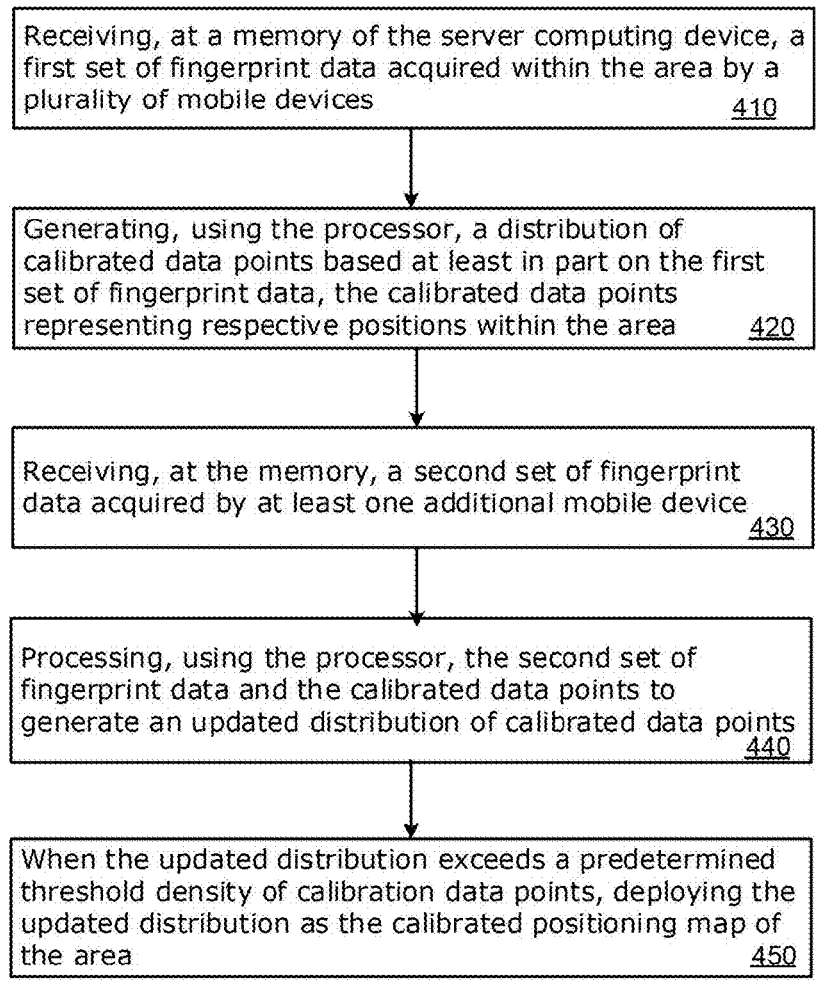
FIG. 4 illustrates, in an example embodiment, a method of operation of a positioning calibration system.

FIG. 4 illustrates, in an example embodiment, a method of operation of positioning calibration system 100. In describing examples of FIG. 4, reference is made to the examples of FIGS. 1-3 for purposes of illustrating suitable components or elements for performing a step or sub-step being described.

Examples of method steps described herein are related to the use of positioning calibration server 101, variously referred to herein as server 101, for implementing the techniques described herein. According to one embodiment, the techniques are performed by positioning calibration logic module 105 of server 101 in response to the processor 301 executing one or more sequences of software logic instructions that constitute calibration logic module 105. In embodiments, calibration logic module 105 may include the one or more sequences of instructions within sub-modules including fingerprint data acquisition module 305, calibration module 306 and calibrated positioning map module 307. Such instructions may be read into memory 302 from machine-readable medium, such as memory storage devices. Execution of the sequences of instructions contained in fingerprint data acquisition module 305, calibration module 306 and calibrated positioning map module 307 of calibration logic module 105 in memory 302 causes processor 301 to perform the process steps described herein. In alternative implementations, at least some hard-wired circuitry may be used in place of, or in combination with, the software logic instructions to implement examples described herein. Thus, the examples described herein are not limited to any particular combination of hardware circuitry and software instructions.

At step 410, receiving, at fingerprint data acquisition module 305 of memory 302 of the server computing device 101, a first set of fingerprint data acquired within the area by a plurality of mobile devices 102a-n. The area may be an indoor area within a shopping mall, an airport, a warehouse, a university, or any at least partially enclosed building. Acquisition of the first and second sets of fingerprint data may be automatically triggered at respective mobile devices upon an event occurrence. The event occurrence may consist of a user redeeming a coupon at a merchant within a shopping mall, scanning a barcode, using an RFID tag, or may be based on accessibility of a proximity beacon wireless signal, in some examples. Acquisition of the fingerprint data by a user's mobile device may thus be automatically triggered upon the event occurrence at any one of a predetermined set of fixed positions within the area. In this manner, a user of mobile device 102 may, in effect, passively assist in the positioning calibration process by acquiring fingerprint data, then allowing uploading or other transfer of the acquired fingerprint data to positioning calibration server 101 for further processing. The fingerprint data may be acquired using sensor devices 205 of the mobile devices, including but not limited to an accelerometer, a gyroscope, a magnetometer, a barometer, and a wireless signal strength sensor. The fingerprint data may include any one of an orientation, a magnetic field strength and direction, a received wireless signal strength, a barometric pressure, at a position within the area for respective mobile devices.

In embodiments, the fingerprint data, as acquired from the mobile devices, further includes respective time-stamps, whereby the orientation and other inertial sensor data, the magnetic field strength and direction, the received wireless signal strength, the barometric pressure, and the position data can be time-correlated with respect to any given position along a trajectory or trajectory segment of the mobile devices, in accordance with the respective time-stamps. Additionally, given that sampling times and sampling rates applied to particular ones of device sensors 205 may be different, the signal and sensor information as measured may be time-averaged across particular periods of time, with the time-averaged value being used to represent the signal information at any given instance of time within that particular period of time in which the signal information is time-averaged.

At step 420, generating, using the instructions of calibration module 306 executed in processor 301, a distribution of calibrated data points based at least in part on the first set of fingerprint data, the calibrated data points representing respective positions within the area, which may be an indoor area, in embodiments. The term "position" as used herein refers to a coordinate location, and may be expressed in local or global (X, Y) coordinate terms.

At step 430, receiving, at fingerprint data acquisition module 305 of memory 302, a second set of fingerprint data acquired by at least one additional mobile device.

At step 440, processing, via the instructions constituting calibration module 306 executable in processor 301, the second set of fingerprint data and the calibrated data points to generate an updated distribution of calibrated data points. The processing to generate the distribution of calibrated data points may include matching the fingerprint data based at least partly on the correlations, amalgamating the matched data from respective ones of the plurality of mobile devices 102a-n and any additional mobile devices into a cumulative calibration dataset, and then generating, based on the cumulative calibration dataset, the distribution of calibrated data points mapped to respective positions within the area.

At step 450, using the executable instructions of calibrated positioning map module 307, when the updated distribution exceeds a predetermined threshold density of calibration data points, deploying the updated distribution as the calibrated positioning map of the area. In another embodiment, the threshold density for deployment may be dynamically determined, and dynamically updated, based on updating at least one of the density of calibration data points and the consistency amongst the calibration data points relative to a neighboring area contiguous with the area. Dynamically updating the threshold density in the latter manner allows the system to automatically detect and correct potential calibration inconsistencies prior to deploying the calibrated positioning map of the area. A density determination algorithm may be applied, in one embodiment, to establish the predetermined threshold density based on validating the updated distribution of calibrated data points as sufficient for deployment representing the calibrated position map of the area.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mention of the particular feature. Thus, the absence of describing combinations should not preclude the inventor from claiming rights to such combinations.

What is claimed is:

1. A method for deploying a positioning map of an area, the method executed in a processor of a server computing device and comprising:
   generating, using the processor, a distribution of positioning data points based at least in part on a first set of fingerprint data, the positioning data points calibrated in accordance with respective positions within the area;
   receiving, at the memory, a second set of fingerprint data;
   processing, using the processor, the second set of fingerprint data and the positioning data points to generate an updated distribution of positioning data points; and
   when the updated distribution exceeds a threshold density of positioning data points, deploying the updated distribution as the positioning map of the area.

2. The method of claim 1 wherein the area is an indoor area within at least one of a shopping mall, an airport, a warehouse, a university and an at least partially enclosed building.

3. The method of claim 1, wherein the first and second sets of fingerprint data are automatically acquired from a plurality of mobile devices upon an event occurrence, the event occurrence consisting of at least one of redeeming a coupon, scanning a barcode, using of an RFID tag, and based on a proximity beacon wireless signal.

4. The method of claim 3, wherein the first and second sets of fingerprint data are automatically acquired upon the event occurrence at any one of a predetermined set of fixed positions within the area.

5. The method of claim 1 wherein the first and second sets of fingerprint data are acquired from a respective sensor device of a plurality of mobile devices.

6. The method of claim 5 wherein the sensor device is at least one of an accelerometer, a gyroscope, a magnetometer, a barometer, and a wireless signal strength sensor.

7. The method of claim 1 wherein the fingerprint data includes at least one of an orientation, a magnetic field strength and direction, a received wireless signal strength, a barometric pressure, and a position within the area.

8. The method of claim 7 wherein the fingerprint data includes respective time-stamps, whereby the orientation, the magnetic field strength and direction, the received wireless signal strength, the barometric pressure, and the position data include correlations in accordance with the respective time-stamps.

9. The method of claim 8 wherein the processing to generate the distribution of positioning data points comprises:
   matching the fingerprint data based at least partly on the correlations;
   amalgamating the matched fingerprint data into a cumulative positioning dataset; and
   generating, based on the cumulative positioning dataset, the distribution of positioning data points mapped to respective positions within the area.

10. The method of claim 1 wherein a density determination algorithm establishes the threshold density as a predetermined threshold density based on validating the updated distribution of positioning data points as sufficient for deploying as the positioning map of the area.

11. A server computing system for deploying a positioning map of an area, the server system comprising:
   a processor;
   a memory storing a set of instructions, the instructions executable in the processor to:
   generate a distribution of positioning data points based at least in part on a first set of fingerprint data, the positioning data points calibrated in accordance with respective positions within the area;
   receive, at the memory, a second set of fingerprint data;
   process the second set of fingerprint data and the positioning data points to generate an updated distribution of positioning data points; and
   when the updated distribution exceeds a threshold density of positioning data points, deploy the updated distribution as the positioning map of the area.

12. The server computing system of claim 11 wherein the area is an indoor area within at least one of a shopping mall, an airport, a warehouse, a university and an at least partially enclosed building.

13. The server computing system of claim 11 wherein the first and second sets of fingerprint data are automatically acquired from a plurality of mobile devices upon an event occurrence, the event occurrence consisting of at least one of redeeming a coupon, scanning a barcode, using of an RFID tag, and based on a proximity beacon wireless signal.

14. The server computing system of claim 13, the first and second sets of fingerprint data are automatically acquired upon the event occurrence at any one of a predetermined set of fixed positions within the area.

15. The server computing system of claim 11 wherein the first and second sets of fingerprint data are acquired from a respective sensor device of the plurality of mobile devices, wherein the sensor device is one of an accelerometer, a gyroscope, a magnetometer, a barometer, and a wireless signal strength sensor.

16. The server computing system of claim 11 wherein the fingerprint data includes at least one of an orientation, a magnetic field strength and direction, a received wireless signal strength, a barometric pressure, and a position within the area.

17. The server computing system of claim 16 wherein the fingerprint data includes respective time-stamps, whereby the orientation, the magnetic field strength and direction, the received wireless signal strength, the barometric pressure, and the position data include correlations in accordance with the respective time-stamps.

18. The server computing system of claim 11 wherein a density determination algorithm establishes the threshold density as a predetermined threshold density based on validating the updated distribution of positioning data points as sufficient for deploying as the positioning map of the area.

19. The server computing system of claim 18 further comprising instructions executable in the processor to:
   match the fingerprint data based at least partly on the correlations;
   amalgamate the matched fingerprint into a cumulative positioning dataset; and
   generate, based on the cumulative positioning dataset, the distribution of positioning data points mapped to respective positions within the area.

20. A non-transitory computer-readable medium storing instructions that, when executed by one or more processors of a computing device, causes the computing device to:
   generate a distribution of positioning data points based at least in part on a first set of fingerprint data, the positioning data points calibrated in accordance with respective positions within an at least partly indoor area;
   receive, at the memory, a second set of fingerprint data;

process the second set of fingerprint data and the positioning data points to generate an updated distribution of positioning data points; and when the updated distribution exceeds a threshold density of position data points, deploy the updated distribution as the positioning map of the at least partly indoor area.

* * * * *